(12) United States Patent
Cho et al.

(10) Patent No.: US 8,836,184 B2
(45) Date of Patent: Sep. 16, 2014

(54) COMPRESSOR FOR VEHICLE

(75) Inventors: Seonk Kook Cho, Daejeon-si (KR); Kyung Hun Jung, Daejeon-si (KR); Kyung Seok Cho, Daejeon-si (KR); Chan Ho Baek, Daejeon-si (KR)

(73) Assignee: Halla Climate Control Corporation (KR)

( * ) Notice: Subject to any disclaimer, the term of this patent is extended or adjusted under 35 U.S.C. 154(b) by 350 days.

(21) Appl. No.: 13/193,709

(22) Filed: Sep. 19, 2011

(65) Prior Publication Data

US 2012/0070321 A1 Mar. 22, 2012

(30) Foreign Application Priority Data

Sep. 20, 2010 (KR) .................. 10-2010-0092559
Jun. 13, 2011 (KR) .................. 10-2011-0057045

(51) Int. Cl.
*H02K 3/50* (2006.01)
*F04B 35/04* (2006.01)
*H02K 1/18* (2006.01)
*H02K 5/22* (2006.01)

(52) U.S. Cl.
CPC ...... *F04B 35/04* (2013.01); *H02K 3/50* (2013.01); *H02K 1/185* (2013.01); *H02K 5/225* (2013.01)
USPC .............................. 310/71; 310/89

(58) Field of Classification Search
USPC ............. 310/71, 89; 417/410.1, 423.7; 439/620.26
See application file for complete search history.

(56) References Cited

U.S. PATENT DOCUMENTS

| 4,004,169 | A | * | 1/1977 | Charlton .................. 310/71 |
| 4,215,464 | A | * | 8/1980 | Miller .................. 29/596 |
| 5,877,572 | A | * | 3/1999 | Michaels et al. ........... 310/179 |
| 6,008,559 | A | | 12/1999 | Asano et al. |
| 6,429,557 | B2 | * | 8/2002 | Sheeran et al. ............ 310/71 |
| 6,548,924 | B2 | * | 4/2003 | Furukawa et al. ......... 310/68 C |
| 6,595,760 | B2 | * | 7/2003 | Shida et al. ............ 417/410.1 |
| 7,696,660 | B2 | * | 4/2010 | Koike et al. ............ 310/71 |
| 2008/0054749 | A1 | * | 3/2008 | Koike et al. ............ 310/179 |
| 2010/0026128 | A1 | | 2/2010 | Ionel |
| 2010/0133940 | A1 | | 6/2010 | Grossmann |
| 2011/0068652 | A1 | | 3/2011 | Qin |

FOREIGN PATENT DOCUMENTS

| JP | 08 247030 | 9/1996 |
| JP | 09 121 493 | 5/1997 |
| JP | 2004 176 682 | 6/2004 |
| JP | 2004 245227 | 9/2004 |
| JP | 2005 1306 27 | 5/2005 |
| JP | 2005 291 004 | 10/2005 |
| JP | 3740 482 | 11/2005 |
| JP | 2007 330060 | 12/2007 |
| JP | 4123 436 | 5/2008 |
| KR | 11-299199 | 10/1999 |
| KR | 10 2001 0112088 | 12/2001 |

(Continued)

*Primary Examiner* — Tran Nguyen
(74) *Attorney, Agent, or Firm* — Daniel A. Thomson; Emerson Thomson Bennett, LLC (57) ABSTRACT

Disclosed is a motor-driven compressor for a vehicle adapted to fix a connector of an electric motor for a vehicle compressor. The compressor for a vehicle includes a rotor configured be rotated by an electromagnetic force generated when a current flow through a coil, a stator having at least one connector fixing slot, and a connector having a body fixed to the connector fixing slot.

7 Claims, 7 Drawing Sheets

(56) References Cited

FOREIGN PATENT DOCUMENTS

| KR | 1020 030 0634 12 | 7/2003 |
| KR | 2007 236096 | 9/2007 |
| KR | 10 2007 0113192 | 11/2007 |
| KR | 2009 150235 | 7/2009 |
| KR | 2010 059809 | 3/2010 |

* cited by examiner

Prior Art

COMPRESSOR FOR VEHICLE

BACKGROUND OF THE INVENTION

1. Field of the Invention

This document relates to a compressor for a vehicle. More particularly, this document relates to a motor-driven compressor for a vehicle, which has a structure allowing a connector of an electric motor to be easily fixed.

2. Description of the Related Art

In recent years, hybrid vehicles or electric vehicles using both fossil fuels and electricity as drive sources are getting the spotlight due to low pollution/high-fuel efficiency policies against depletion of fossil fuels and environmental contaminations, and various studies have been actively performed therefor.

Such a hybrid vehicle or electric vehicle obtains power for driving the vehicle through an electric motor. Accordingly, recently, motor-driven compressors have been extensively used instead of mechanical compressors in existing vehicle air conditioning systems.

A motor-driven compressor includes an electric motor for converting electric energy to mechanical energy, and an inverter for controlling rotation of the electric motor. Accordingly, the assembled structure and size of the electric motor greatly influence upon the assembled structure of the entire compressor.

Such electric motors for a motor-driven compressor generally include a cylindrical rotor and a stator on which coils are wound to surround the outer periphery of the rotor, and their winding methods are classified into distributed winding and concentrated winding.

Figure 1:
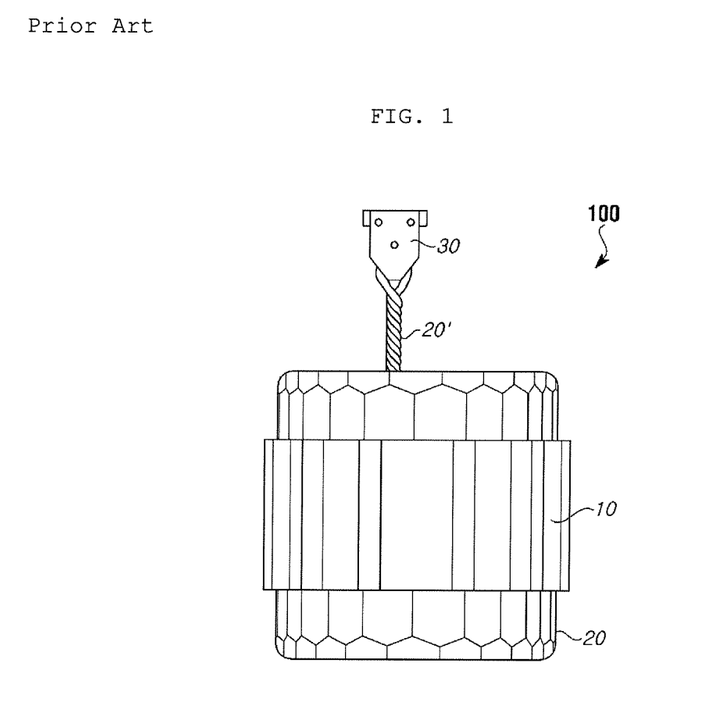
FIG. 1 is a view schematically showing a conventional electric motor for a vehicle compressor.

FIG. 1 is a view schematically showing a typical electric motor for a vehicle compressor. As shown in FIG. 1, the electric motor includes a cylindrical stator 10 surrounding the outer periphery of a rotor (not shown). The cylindrical shape of the stator 10 is axially hollowed such that the rotor is installed in the hollowed portion of the stator 10.

Meanwhile, coils are wound on the stator, in which case a plurality of slots (not shown) are formed on the inner periphery of the stator 10 in a direction parallel to the axis of the stator 10.

Coils are wound through the slots, and in particular, the coils wound in parallel to the axis of the stator 10 along the slots are exposed to the outside of the stator 10 at axial opposite ends of the stator 10. Hereinafter, sections formed by the coils exposed at the axial opposite ends of the stator 10 are called end turns 20.

The coils extending from one of the end turns 20 form a harness 20' to receive power of three phases (U, V, and W phases) for driving the electric motor from an inverter, and three terminals and a connector 30 surrounding the terminals are provided at a tip end of the harness 20'. The connector 30 is exposed through an opening formed at one side of a compressor housing when the electric motor is received within the compressor housing such that the terminals of the connector 30 are electrically connected to the inverter installed outside the opening.

However, the above-described technology has the following disadvantages.

Since the terminals through which power is input from the inverter and the connector 30 are provided at an end of the harness 20', the connector 30 still remains unfixed. Accordingly, the connector 30 needs to be manually located at the opening of the compressor housing when the electric motor is assembled within the compressor housing.

In particular, since an opening of the compressor housing for receiving the electric motor into the compressor housing and an opening of the compressor housing through which the connector is exposed toward the inverter are formed on opposite sides in the vehicle compressor where a compression section for compression of a refrigerant, the electric motor, and the inverter are arranged in series, it is bothersome to manually locate the connector at the opening of the compressor housing.

In addition, since the connector 30 remains unfixed even after assembled, its position may be unstably changed by an external impact.

Furthermore, since the connector 30 is withdrawn from an end turn of the stator of the electric motor in the harness structure, a space between the electric motor and the inverter is inevitably necessary to connect the electric motor received within the compressor housing and the inverter, considering the harness structure. Accordingly, there is almost no room to improve the axial length of the motor-driven compressor.

SUMMARY

In one implementation, a compressor is disclosed for a vehicle air conditioning. The compressor includes an electric motor. The electric motor includes a rotor configured to be rotated by an electromagnetic force generated while a current flows through a coil, a stator having a cylindrical shape surrounding an outer periphery of the rotor and having a plurality of winding slots formed on an inner peripheral surface thereof to extend in parallel to a rotary shaft of the rotor, and coils being wound through the winding slots. The compressor further includes a connector configured to fix a plurality of terminals formed at a tip end of the coils wound on the stator and having a body fixed to the stator.

This summary is not intended to identify key features of essential features of the claimed subject matter, nor is it intended to be used as said in determining the scope of the claimed subject matter.

DETAILED DESCRIPTION OF THE IMPLEMENTATIONS

Hereinafter, a compressor for a vehicle according to a preferred implementation of the present invention will be described in detail with reference to the accompanying drawings.

A motor-driven compressor for a vehicle generally includes a compression section in which a refrigerant is compressed as a mechanical component reciprocates, an electric motor configured to transmit mechanical energy to the compression section, and an inverter configured to supply electric energy to the electric motor.

However, since the subject matter of the present invention lies in a structure of an electric motor and the remaining parts of the compressor do not differ from those of a general motor-driven compressor for a vehicle, an electric motor for a vehicle compressor of the present invention will be mainly described hereinafter.

Figure 2:
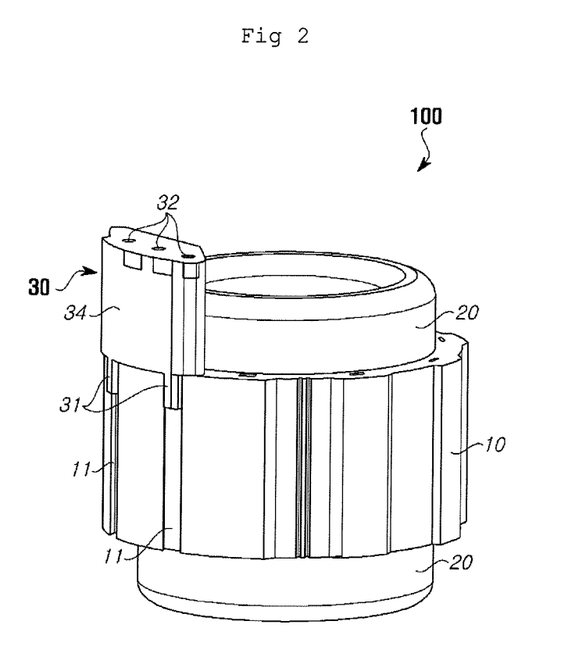
FIG. 2 is a perspective view schematically showing an outer appearance of an electric motor for a vehicle compressor according to an implementation of the present invention.
Figure 3:
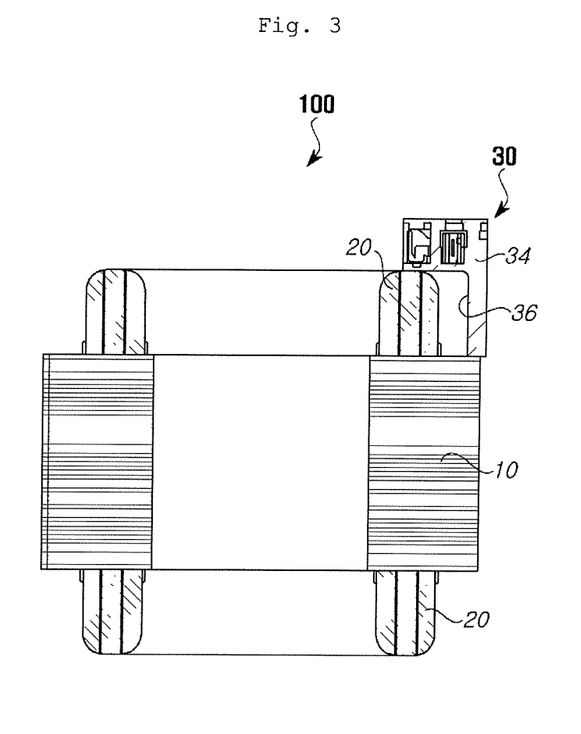
FIG. 3 is a sectional view showing the electric motor for a vehicle compressor according to the implementation of the present invention.
Figure 4:
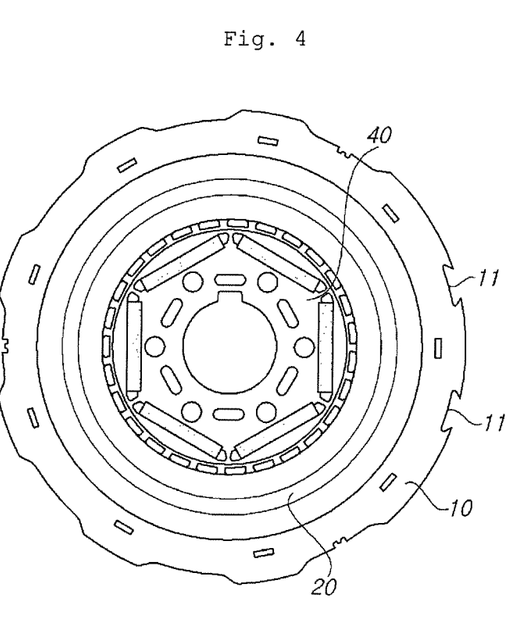
FIG. 4 is a top view showing the electric motor for a vehicle compressor according to the implementation of the present invention.
Figure 5:
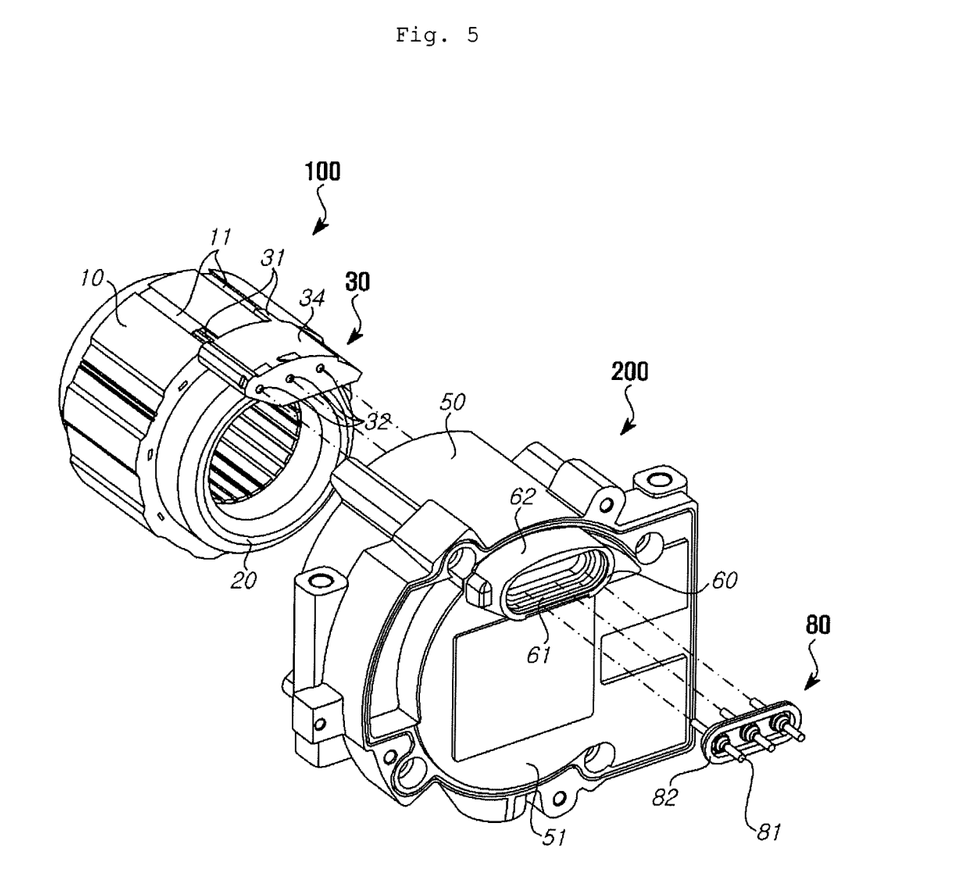
FIG. 5 is a perspective view showing the electric motor for a vehicle compressor and a compressor housing according to the implementation of the present invention.

FIG. 2 is a perspective view schematically showing an outer appearance of an electric motor for a vehicle compressor according to an implementation of the present invention. FIG. 3 is a sectional view showing the electric motor for a vehicle compressor according to the implementation of the present invention. FIG. 4 is a top view showing the electric motor for a vehicle compressor according to the implementation of the present invention. FIG. 5 is a perspective view showing the electric motor for a vehicle compressor and a compressor housing according to the implementation of the present invention.

As shown in the drawings, the electric motor 100 for a vehicle compressor according to the implementation of the present invention includes a substantially cylindrical stator 10. As shown in FIG. 3, the stator 10 has a cylindrical portion which penetrates therethrough.

A plurality of winding slots are formed on an inner peripheral surface of the stator 10 to extend in a penetration direction of the stator 10, and coils are wound through the winding slots in an extension direction of the winding slots.

The bundle of wound coils is exposed to the outside at opposite ends of the stator 10 to form end turns 20. The end turns 20 are exposed by a predetermined length from the stator 10 at the opposite ends of the stator 10.

One or more connector fixing slots 11 recessed by a predetermined depth from an outer peripheral surface of the stator 10 are formed at one side of the outer peripheral surface of the stator 10 to directly fix a body of a connector 30 which will be described later to the stator 10. While two connector fixing slots 11 are shown in the drawings, the number of connector fixing slots 11 may be suitably selected if necessary.

While the connector fixing slots 11 may be recessed along the entire length of the stator 10 as shown in the drawings, it may be recessed only by a predetermined distance from one end of the stator 10.

Moreover, as can be seen in the top view of FIG. 4, the connector fixing slots 11 have a shape whose width becomes larger as it goes toward the center of the stator 10 so that the connector 30 inserted into the connector fixing slots 11 cannot be withdrawn from them.

Meanwhile, the electric motor 100 is provided with the connector 30. The connector 30 serves to surround and fix a plurality of terminals provided at a tip end of the coils extending from the coil end turns 20.

The connector 30 includes a connector body 34 forming an overall outer appearance of the connector 30, one or more fixing bosses 31 extending integrally with the connector body 34, and a plurality of terminal holes 32 into which coil terminals are fixed.

The connector body 34 may be formed of a material such as a thermoplastic resin, and is substantially L-shaped as shown in FIG. 3 such that the terminal holes 32 are formed at an upper portion thereof and the fixing bosses 31 are formed at a lower end thereof.

That is, an end turn positioning portion 36 may be formed in the connector body 34 so that the connector 30 can be directly coupled to the stator 10 without interfering the end turn 20. Then, a height of the end turn positioning portion 36 is determined in advance to correspond to a height of the end turn 20.

The fixing bosses 31 have a shape corresponding to the shape of the connector fixing slots 11 formed at the outer peripheral surface of the stator 10 so as to be inserted into the connector fixing slots 11 respectively.

Here, the fixing bosses 31 of the connector 30 are inserted into the connector fixing slots 11 formed at the outer peripheral surface of the stator 10 so that the connector 30 can be supported in an axial direction of the stator 10.

Meanwhile, a rotor 40 is installed in the cylindrical interior of the stator 10. As shown in FIG. 4, the rotor 40 is a cylindrical member installed in a cylindrical space of the stator 10, and may include a plurality of permanent magnets to be rotated by an electromagnetic force generated as a current flows through the coils wound on the stator 10. A rotary shaft (not shown) is connected to the rotor 40 to transmit a rotary force to the compression section provided within the compressor.

The above-described electric motor 100 is installed within the vehicle compressor, and is received within the compressor housing 200 as shown in FIG. 5.

Although the compressor housing 200 includes two or more housing bodies 50, only one of them is shown in the drawings. The housing bodies 50 are coupled to each other so that the interior of the compressor can be sealed.

Meanwhile, one end of the housing body 50 is opened to install the electric motor 100 therein. Accordingly, the electric motor 100 is received into the interior of the compressor housing 200 through the opened end of the housing body 50. Then, the electric motor 100 is introduced into the housing body 50 from one end of the housing body 50 to which the connector 30 is fixed.

A partition wall 51 is formed at a side opposite to the opened end of the housing body 50. The partition wall 51 blocks a space in which the electric motor 100 is received from the outside. An inverter for transmitting electric power to the electric motor 100 is installed outside the partition wall 51.

Then, a pocket 60 is formed at one side of the partition wall 51 to form a path along which electric power is supplied from the inverter to the electric motor 100. The pocket 60 penetrates the partition wall 51 and is formed at a location corresponding to a location where the body 34 having the terminal holes 32 is positioned when the electric motor 100 is received in the housing body 50. The pocket 60 has an opening 61 in which the connector body 34 is positioned, and a boss 62 formed at a circumference of the opening 61 to protrude to the outside.

That is, if the electric motor 100 having the connector 30 is introduced into the housing body 50, the connector body 34 is positioned in the opening 61 of the pocket 60 and the terminal holes 32 formed at an upper portion of the connector body 34 are exposed to the outside through the opening 61.

Connecting pins 81 formed in a terminal connector 80 coupled to the boss 62 of the pocket 60 is inserted into the exposed terminal holes 32. A sealing portion 82 for sealing the metallic terminal connecting pins 81 corresponding to the terminal holes 32 and the opening 82 is formed in the terminal connector 80, and the connecting pins 81 of the terminal connector 80 are inserted into the terminal holes 32 to be connected to the coil terminals of the electric motor 100 and an opposite end thereof is connected to the inverter so that electric power can be input to the electric motor 100 from the inverter and the sealing portion 82 can seal the connector positioning portion.

Then, since one end of the connector 30 is fixed to the stator 10 to be axially supported and an opposite end thereof is supported by the opening 61, the connector can be fixed more stably in a structure the electric motor 100 and the inverter are arranged in series as shown in the drawings.

As mentioned above, the axial length of the compressor can be improved with a structure where the pocket 60 is formed on one side of the partition wall opposite to an opened end of the housing body 50, which will be described in the following.

Figure 6:
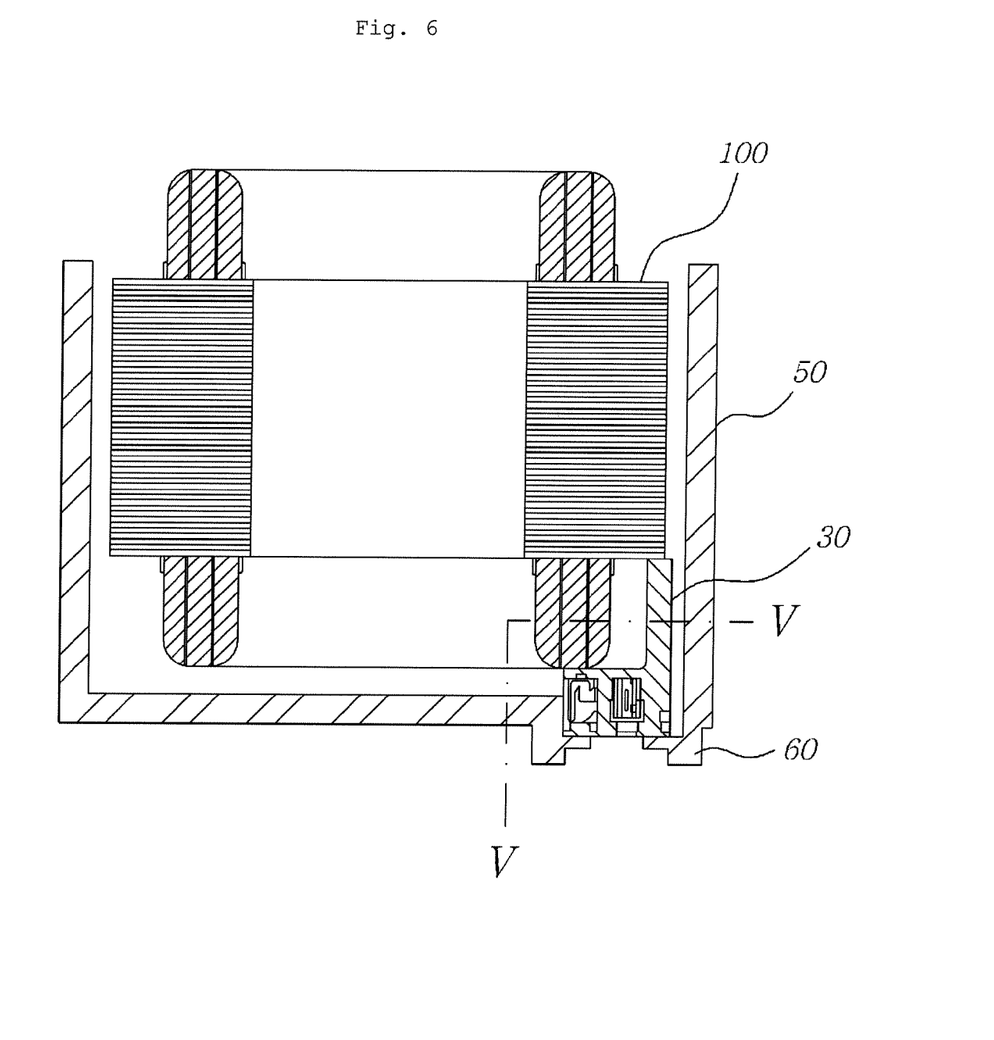
FIG. 6 is a sectional view showing a state where the electric motor for a vehicle compressor according to the implementation of the present invention is mounted within the compressor housing.
Figure 7:
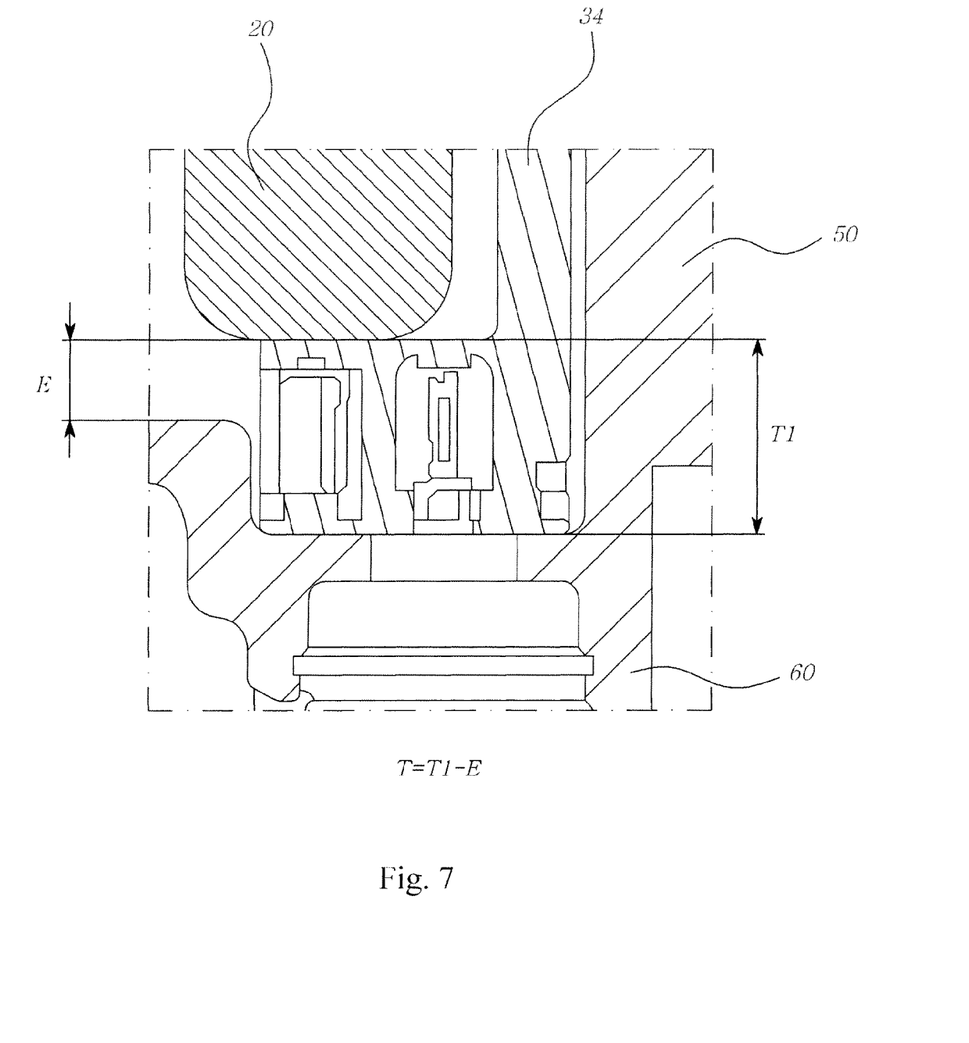
FIG. 7 is a partially enlarged sectional view taken along line V-V of FIG. 6.

FIG. 6 is a sectional view showing a state where the electric motor for a vehicle compressor according to the implementation of the present invention is mounted within the compressor housing. FIG. 7 is a partially enlarged sectional view taken along line V-V of FIG. 6.

As can be seen in FIG. 6, in the compressor of the present invention, the electric motor 100 having the connector 30 is introduced into the housing body 50 and is positioned in the pocket 60. As can be seen in FIG. 7, when a protruding length of the opening 61 of the pocket 60 from the bottom surface of the housing body 50 to the connector body 34 is T, T corresponds to a length obtained by subtracting a length E between the end turn 20 of the stator and a bottom end of the housing body 50 from a length T1 of the connector body 34.

Thus, an axial length of the compressor can be improved, for example, a spatial margin for assembling the inverter on aside of the pocket is available in an assembled structure where the conventional electric motor and the inverter are located on the same axial line.

Although an implementation regarding the subject matter of the present invention has been described for illustrative purposes, those skilled in the art will appreciate that various modifications, additions and substitutions are possible, without departing from the scope and spirit of the invention as disclosed in the accompanying claims.

What is claimed is:

1. A compressor for a vehicle comprising:
    an electric motor including:
    a rotor configured to be rotated by an electromagnetic force generated while a current is flowing through coils;
    a stator having a cylindrical shape formed by a plurality of stacked plates, surrounding an outer periphery of the rotor and having a plurality of winding slots formed on an inner peripheral surface thereof to extend in parallel to a rotary shaft of the rotor, the coils being wound through the winding slots;
    a connector configured to fix a plurality of terminals formed at a tip end of the coils wound on the stator and having a body fixed to the stator, wherein at least one connector fixing slot extending in a direction parallel to the rotary axis is formed on an outer peripheral surface of the stator, and the connector has at least one fixing boss formed integrally with the connector and extending from the connector to be inserted into the connector fixing slots, and wherein the connector fixing slot extends along an entire length of the stator in a direction parallel to the rotary axis of the stator; and,
    a housing body configured to receive the connector, wherein a pocket is formed at one side of a partition wall opposite to an opened end of the housing body, and the pocket has an opening in which the connector body is positioned and a boss formed at a circumference of the opening to protrude toward an outside, wherein a length of the opening of the pocket is obtained by subtracting a length between an end turn and a bottom end of the housing body from a length of the connector body.

2. The compressor for a vehicle of claim 1, further comprising:
    a terminal connector coupled to the boss of the pocket,
    wherein the terminal connector has a terminal connecting pin inserted into a terminal hole and a sealing portion for sealing the opening.

3. The compressor for a vehicle of claim 1, wherein a plurality of terminal holes to which the terminals are fixed are formed in the connector.

4. The compressor for a vehicle of claim 1, wherein, when the fixing boss is inserted into and fixed to the connector fixing slot, the connector extends by a height higher than a height of an end turn formed by the coils wound through the winding slots and exposed to the outside of the stator from the stator.

5. The compressor for a vehicle of claim 4, wherein the connector has an end turn positioning portion formed by withdrawing a portion of the body to prevent interference of the end turn.

6. The compressor for a vehicle of claim 1, wherein, when the fixing boss is inserted into and fixed to the connector fixing slot, the connector extends by a height higher than a height of an end turn formed by the coils wound through the winding slots and exposed to the outside of the stator from the stator.

7. The compressor for a vehicle of claim 6, wherein the connector has an end turn positioning portion formed by withdrawing a portion of the body to prevent interference of the end turn.

* * * * *